United States Patent [19]

Fleischmann et al.

[11] Patent Number: 5,541,275
[45] Date of Patent: Jul. 30, 1996

[54] BIODEGRADABLE VINYL ESTER COPOLYMERS

[75] Inventors: Gerald Fleischmann; Herbert Eck; Alfred Prasse, all of Burghausen, Germany

[73] Assignee: Wacker-Chemie GmbH, Munich, Germany

[21] Appl. No.: 207,946

[22] Filed: Mar. 8, 1994

[30] Foreign Application Priority Data

Mar. 11, 1993 [DE] Germany ............... 43 07 759.5

[51] Int. Cl.⁶ .................................. C08F 16/04
[52] U.S. Cl. .............. 526/266; 526/270; 526/316; 526/914
[58] Field of Search .............. 524/108; 526/266, 526/270, 316, 914

[56] References Cited

U.S. PATENT DOCUMENTS

| | | | |
|---|---|---|---|
| 5,115,058 | 5/1992 | Sikkema et al. | 526/266 |
| 5,234,978 | 8/1993 | Delrue et al. | 524/388 |

OTHER PUBLICATIONS

Narajima, Advances in Chemistry Sierin 125, PICS "Fractionation of Tinear Polsethylene with Gel Permeation Chromatography" 1973.
Huang, S. J., Encyl. Polym. Sciences vol. 2, 220–243.
Bailey, W. J., Journal of Polym. Science: Polym. Chem. Ed., vol. 20, 3021–3030 (1982).
Suzuki, T., Journal of Applied Polym. Science: Applied Polym. Symposium 35 431–437 (1979).
Derwent Abstract–JP–A 02/214719.

*Primary Examiner*—Jeffrey T. Smith
*Attorney, Agent, or Firm*—Burgess, Ryan and Wayne

[57] ABSTRACT

The invention provides biodegradable vinyl ester copolymers of one or more monomers selected from the group of vinyl esters of unbranched or branched alkylcarboxylic acids having from 1 to 18 carbon atoms, which contain from 0.1 to 40% by weight, based on the total weight of the copolymer, of one or more cyclic ketene acetals selected from the group consisting of 2-methylene-1,3-dioxepane, 2-methylene-1,3-dioxolane, 2-methylene-1,3-dioxane and have a molecular weight>50,000.

11 Claims, No Drawings

BIODEGRADABLE VINYL ESTER COPOLYMERS

BACKGROUND OF THE INVENTION

1. Field of the Invention

The invention relates to biodegradable copolymers of vinyl esters with cyclic ketene acetals.

2. Related Art

It is known that polymers whose carbon backbone is interrupted by functional groups such as ester, amide, carbonate, urethane or ether groups and whose hydrocarbon moieties between the functional groups are predominantly of an aliphatic nature can be degraded by microorganisms (S. J. Huang, Encyclopedia of Polymer Sciences Vol. 2, 220–243). In contrast, polyolefins having a purely carbon backbone are resistant to microbial attack. An exception is, for example, polyvinyl alcohol, which is completely degraded to carbon dioxide and water after oxidative cleavage (T. Suzuki et al., J. Appl. Poly. Sci., Poly. Symp. 35 (1973), 431). In contrast, polyvinyl acetate is only degraded with difficulty, since it first has to largely hydrolyze to polyvinyl alcohol.

W. J. Bailey et al., J. Polym. Sci. Chem. Ed. 20 (1982), 3021, describes the preparation of vinyl acetate copolymers containing 33 and 49 mol % of 2-methylene-1,3-dioxepane. The biodegradability of these copolymers is assumed but not tested. The disadvantages of this method are the low degrees of conversion (52 and 68%) at extremely long polymerization times (up to 48 hours) and the low molecular weights caused by the high proportion of initiator (1.0 and 1.2 mol %).

JP-A 02/214719 (Derwent Abstract) discloses polymers of olefins, acrylates, vinyl esters or styrenes with 2-methylene-1,3-dioxepane as hydrolyzable polymers for use in marine paints.

SUMMARY OF THE INVENTION

Against this background, it is an object of the invention to provide biodegradable vinyl ester copolymers which combine a very low content of ketene acetal comonomers having biodegradability and high molecular weights which make them usable in application areas typical for vinyl ester polymers.

The invention therefore provides biodegradable vinyl ester copolymers of one or more monomers selected from the group of vinyl esters of unbranched or branched alkylcarboxylic acids having from 1 to 18 carbon atoms, which contain from 0.1 to 40% by weight, based on the total weight of the copolymer, of one or more cyclic ketene acetals selected from the group consisting of 2-methylene-1,3-dioxepane, 2-methylene-1,3-dioxolane, 2-methylene-1,3-dioxane and have a molecular weight>50,000.

DESCRIPTION OF THE PREFERRED EMBODIMENTS

Preferred vinyl esters are vinyl acetate, vinyl propionate, vinyl butyrate, vinyl 2-ethylhexanouate, vinyl laurate, 1-methylvinyl acetate, vinyl pivalate and vinyl esters of α-branched monocarboxylic acids having 9 or 10 carbon atoms, for example VeoVa9® or VeoVa10®. Particular preference is given to vinyl acetate.

The vinyl ester copolymers can, if desired, contain from 1.0 to 65% by weight, based on the total weight of the comonomer phase, of α-olefins, such as ethylene or propylene, and/or vinylaromatics, such as styrene, and/or vinyl halides, such as vinyl chloride, and/or acrylic esters or methacrylic esters of alcohols having from 1 to 18 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and/or ethylenically unsaturated dicarboxylic esters or derivatives thereof, such as dialkyl maleates and dialkyl fumarates having unbranched or branched alkyl radicals having from 1 to 8 carbon atoms, for example diisopropyl fumarate, and maleic anhydride.

Preferably the vinyl ester copolymers contain from 1 to 30% by weight, particularly preferably from 2 to 15% by weight, of the specified cyclic ketene acetals, in particular 2-methylene-1,3-dioxepane. The molecular weight of the vinyl ester copolymers is preferably at least 200,000.

The most preferred vinyl ester copolymers contain: from 85 to 98% by weight of vinyl acetate and from 2 to 15% by weight of 2-methylene-1,3-dioxepane or from 70 to 95% by weight of vinyl acetate, from 5 to 25% by weight of ethylene, and/or from 5 to 30% by weight of dialkyl maleates or dialkyl fumarates and from 2 to 15% by weight of 2-methylene-1,3-dioxepane or from 50 to 70% by weight of vinyl acetate, from 10 to 30% by weight of vinyl esters of an α-branched carboxylic acid, in particular VeoVa9® and/or VeoVa10®, from 5 to 25% by weight of ethylene and from 2 to 15% by weight of 2-methylene-1,3-dioxepane or from 50 to 70% by weight of vinyl acetate, from 1 to 30% by weight of acrylic ester, in particular n-butyl acrylate or 2-ethylhexyl acrylate, from 5 to 25% by weight of ethylene and from 2 to 15% by weight of 2-methylene-1,3-dioxepane. In each case the percentages by weight add up to 100% by weight.

The invention also provides a process for preparing the biodegradable vinyl ester copolymers of the invention by free-radical copolymerization in the presence of from 0.005 to 0.5 mol %, based on the comonomer phase, of free-radical initiators.

Initiation is preferably carried out by means of free-radical formers which have a half-life of up to 100 minutes in the range from 40° to 80° C. Suitable initiators are, for example, peresters, perdicarbonates, diacyl peroxides such as di-t-amyl peroxyoxalate, t-amyl peroxy-neodecanoate, t-butyl peroxyneodecanoate, t-amyl peroxy-pivalate, t-butyl peroxypivalate and dicyclohexyl peroxy-dicarbonate. If desired, the specified free-radical initiators can also be combined with reducing agents in a known manner. Suitable reducing agents are, for example, formaldehyde disulfite salts or ascorbic acid. In the redox initiation, one or both of the redox catalyst components are preferably metered in during the polymerization. Preferably the amount of free-radical initiator used is from 0.005 to 0.05 mol %, based on the comonomer phase.

The preparation of the copolymers is preferably carried out in bulk or in solution. Copolymerization in emulsion or suspension is possible but here a partial hydrolysis of the cyclic ketene acetal has to be expected. Thus, for example, 4-hydroxybutyl acetate is formed from 2-methylene-1,3-dioxepane. The polymerization can be carried out in the customary stirred reactors or autoclaves. A protective gas is preferably used. In the copolymerization of ethylene, the ethylene pressure is from 50 to 50,000 kPa, preferably from 500 to 5000 kPa.

The polymerization can be carried out batchwise or continuously, with or without the use of seed latices, with initial charging of all or individual components of the reaction mixture or with partial initial charging and subsequent metered addition of the components, or of individual components of the reaction mixture, or by the metered addition method without initial charging. All metered additions are preferably carried out at the rate of consumption of the respective component.

Suitable solvents for the preferred solution polymerization are aliphatic hydrocarbons such as hexane, heptane, cyclohexane, or esters, such as methyl acetate, t-butyl acetate, or alcohols, such as t-butanol, t-amyl alcohol, or ethers, such as t-butyl methyl ether.

The polymerization is carried out in a temperature range from 0° to 100° C., preferably between 40° and 80° C. For initiation of the polymerization with redox systems, the polymerization temperatures generally lie between 20° and 80° C. The duration of polymerization is generally between 3 and 10 hours.

The copolymers of the invention can, if desired, be filled; apart from the customary fillers, such as finely divided silica or chalk, particularly suitable fillers are ones which are biodegradable, such as starches, modified starches or other polysaccharides. Likewise, the copolymers of the invention can be modified with plasticizers, preferably biodegradable plasticizers. Examples of these are unbranched alkyl esters of succinic acid or higher α,ω-dicarboxylic acids, polypropylene glycols which may, if desired, be acylated at the ends, aliphatic esters of acylated or unacylated fatty acids or citric acid and also carboxylic acid esters of glycerol.

The copolymers of the invention are suitable, for example, for producing films such as packaging films or mulching films. The copolymers prepared in suspension or emulsion can be used as binders for nonwovens, in particular those based on cellulose, and also as coating materials.

Embodiments of the invention will now be more particularly described by way of example.

Preparation of the Copolymers

Example 1

50 ml of t-butanol were heated to 65° C. in a 500 ml round-bottom flask fitted with stirrer, heating bath, reflux condenser, protective gas inlet and metering-in vessel. Over a period of 100 minutes, a mixture of 98 g (1.14 mol) of vinyl acetate, 2 g (17.5 mmol) of 2-methylene-1,3-dioxepane, 0.3 g (1.2 mmol) of t-butyl peroxyneodecanoate and 100 ml of t-butanol was metered in so that the reaction temperature did not exceed 68° C. Subsequently the mixture was allowed to react further for 5 hours at 70° C. The product was isolated by removing the solvent and residual monomers in vacuo.

Yield: 98.5 g; molecular weight $M_w$: 253,000.

The product contained 1.4% by weight of 2-methylene-1,3-dioxepane incorporated in the polymer.

Example 2

The procedure in Example 1 was followed except that 5 g (44 mmol) of 2-methylene-1,3-dioxepane were initially charged and 95 g (1.1 mol) of vinyl acetate were metered in together with 0.3 g (1.16 mmol) of t-amyl peroxyneodecanoate.

Yield: quantitative; molecular weight $M_w$: 487,000.

The product contained 5.0% by weight of 2-methylene-1,3-dioxepane incorporated in the polymer.

Example 3

180 ml of t-butanol were placed in a 1 l stirred autoclave and heated to 53° C. After addition of 0.28 g (1 mmol) of dicyclohexyl peroxydicarbonate, the autoclave was pressurized with 900 kPa of ethylene and a mixture of 2.8 g (25 mmol) of 2-methylene-1,3-dioxepane and 109.2 g (1.27 mol) of vinyl acetate was metered in over a period of 40 minutes, the temperature being maintained at 53° C. After a total reaction time of 7 hours, the polymerization was stopped by cooling and the product was removed by evaporation of the solvent.

Conversion, based on vinyl acetate, 84.2%. Molecular weight $M_w$: 258,000. The product contained 2% by weight of copolymerized 2-methylene-1,3-dioxepane and 10% by weight of ethylene.

Example 4

The procedure was the same as in Example 3, except that the amount of 2-methylene-1,3-dioxepane was increased to 5.6 g (50 mmol) and the amount of vinyl acetate was reduced to 106.6 g (1.24 mol).

Conversion, based on vinyl acetate, 82%. Molecular weight $M_w$: 265,000. The product contained 4.3% by weight of copolymerized 2-methylene-1,3-dioxepane and 8.4% by weight of ethylene.

Example 5

The procedure was the same as in Example 1, except that a mixture of 75 g (0.87 mol) of vinyl acetate, 20 g (0.16 mol) of butyl acrylate, 5 g (44 mmol) of 2-methylene-1,3-dioxepane and 0.3 g (1.16 mmol) of t-amyl peroxy-neodecanoate was metered in. The conversion was quantitative. Molecular weight $M_w$: 447,000. The product contained 5% by weight of copolymerized 2-methylene-1,3-dioxepane.

Example 6

A mixture of 50 g (0.58 mol) of vinyl acetate, 5 g (44 mmol) of 2-methylene-1,3-dioxepane and 0.42 g (1 mmol) of dilauroyl peroxide was heated for 5 minutes at 70° C. The start of the polymerization could be recognized by an increase in viscosity. The mixture was stirred into 207 g of a 0.35% aqueous polyvinyl alcohol solution (Polyviol®M 05/240) which had been heated to 75° C. After a reaction time of 4 hours at this temperature the polymerization was complete. NMR analysis indicated that 62% by weight of the 2-methylene-1,3-dioxepane had been copolymerized; the remainder had been hydrolyzed to 4-hydroxybutyl acetate. The product contained 5.5% by weight of copolymerized 2-methylene-1,3-dioxepane.

Comparative Example A

The procedure was the same as in Example 1 except that no 2-methylene-1,3-dioxepane was used. The conversion was quantitative; the molecular weight $M_w$ was 287,000.

Comparative Example B

The procedure in Example 3 was followed except that no 2-methylene-1,3-dioxepane was used. The conversion, based on vinyl acetate, was 87.9%; the molecular weight $M_w$ was 238,000 and the ethylene content was 11% by weight.

Testing of the Biodegradability

Testing of the biodegradability of the products from the examples and comparative examples was carried out by the fungus test for microbial attack in accordance with ISO 846 B and by the burial test in accordance with DIN 53739.

Microbial Attack

Films having a thickness of 0.2 mm were produced from the polymers of the examples and comparative examples and these were subjected to a fungus test in accordance with ISO 846, method B. The amount of growth was qualitatively rated from 1 to 5 with increasing microbial attack. Discoloration of the films was denoted by "2", no discoloration by "1". The test results are shown in Table 1.

TABLE 1

| Examples | Amount of growth | Discoloration |
| --- | --- | --- |
| Example 1 | 5 | 2 |
| Example 2 | 5 | 2 |
| Example 3 | 4 | 2 |
| Example 4 | 5 | 2 |
| Example 5 | 4 | 2 |
| Example 6 | 5 | 2 |
| Comparative Example A | 1–2 | 1 |
| Comparative Example B | 1–2 | 1 |

Burial Test In Accordance With DIN 53739

The films of the products from Examples 1 to 4 and Comparative Example B were subjected to the burial test for determination of the loss in mass in active soil. After 3 months, the weight loss due to biological degradation was determined. The results are summarized in Table 2.

TABLE 2

| Examples | Weight loss [%] |
| --- | --- |
| Example 1 | 1.5 |
| Example 2 | 3.0 |
| Example 3 | 2.3 |
| Example 4 | 7.1 |
| Example 6 | 6.5 |
| Comparative Example B | 0 |

Although the invention has been illustrated by the preceding examples, it is not to be construed as being limited to the materials employed therein, but rather, the invention is directed to the generic area as herein before disclosed. Various modifications and embodiments thereof can be made without departing from the spirit or scope thereof.

What is claimed is:

1. A biodegradable vinyl ester copolymer with a molecular weight ($M_w$) of >50,000 consisting essentially of:
    a) at least one vinyl ester monomer selected from the group consisting of vinyl esters of unbranched and branched alkyl carboxylic acids having from 1 to 18 carbon atoms,
    b) 2 to 15% by weight, based on the total weight of the copolymer, of at least one cyclic ketene acetal selected from the group consisting of 2-methylene-1,3-dioxepane, 2-methylene-1,3-dioxolane, and 2-methylene-1,3-dioxane, and
    c) 0 to 65% by weight, based on the total weight of the copolymer, of at least one monomer selected from the group consisting of α-olefins, acrylic esters and methacrylic esters of alcohols having from 1 to 8 carbon atoms, and dialkyl maleates and dialkyl fumarates having unbranched or branched alkyl radicals having from 1 to 8 carbon atoms.

2. A biodegradable vinyl ester copolymer as claimed in claim 1 having a molecular weight ($M_w$) of at least 200,000.

3. A biodegradable vinyl ester copolymer as claimed in claim 1 which contains from 85 to 98% by weight of vinyl acetate and from 2 to 15% by weight of 2-methylene-1,3-dioxepane.

4. A biodegradable vinyl ester copolymer as claimed in claim 1 which contains from 70 to 95% by weight of vinyl acetate, from 5 to 25% by weight of ethylene, from 5 to 30% by weight of a member selected from the group consisting of dialkyl maleates and dialkyl fumarates and from 2 to 15% by weight of 2-methylene-1,3-dioxepane.

5. A biodegradable vinyl ester copolymer as claimed in claim 1 which contains from 70 to 95% by weight of vinyl acetate, from 5 to 25% by weight of ethylene and from 2 to 15% by weight of 2-methylene-1,3-dioxepane.

6. A biodegradable vinyl ester copolymer as claimed in claim 1 which contains from 70 to 95% by weight of vinyl acetate, from 5 to 30% by weight of a member selected from the group consisting of dialkyl maleates and dialkyl fumerates and from 2 to 15% by weight of 2-methylene-1,3-dioxepane.

7. A biodegradable vinyl ester copolymer as claimed in claim 1 which contains from 50 to 70% by weight of vinyl acetate, from 10 to 30% by weight of vinyl esters of an α-branched carboxylic acid, from 5 to 25% by weight of ethylene and from 2 to 15% by weight of 2-methylene-1,3-dioxepane.

8. The biodegradable vinyl ester copolymer as claimed in claim 7, wherein the vinyl ester of an α-branched carboxylic acid is a vinyl ester of an α-branched monocarboxylic ester having 9 C-atoms or 10 C-atoms.

9. A biodegradable vinyl ester copolymer as claimed in claim 1 which contains from 50 to 70% by weight of vinyl acetate, from 1 to 30% by weight of acrylic ester, from 5 to 25% by weight of ethylene and from 2 to 15% by weight of 2-methylene-1,3-dioxepane.

10. The biodegradable vinyl ester copolymer as claimed in claim 9 wherein the acrylic ester is selected from the group consisting of n-butyl acrylate and 2-ethylhexyl acrylate.

11. The biodegradable vinyl ester copolymer of claim 1, which had been prepared by free-radical copolymerization in the presence of from 0.005 to 0.5 mol %, based on the comonomer phase of free radical initiators.

* * * * *